United States Patent
Dyer (10) Patent No.: US 12,219,060 B2
(45) Date of Patent: Feb. 4, 2025

(54) ACCESS POLICY TOKEN

(71) Applicant: Ivanti, Inc., South Jordan, UT (US)

(72) Inventor: Anthony K. Dyer, Royston (GB)

(73) Assignee: Ivanti, Inc., South Jordan, UT (US)

( * ) Notice: Subject to any disclaimer, the term of this patent is extended or adjusted under 35 U.S.C. 154(b) by 134 days.

(21) Appl. No.: 17/730,817

(22) Filed: Apr. 27, 2022

(65) Prior Publication Data

US 2023/0353362 A1    Nov. 2, 2023

(51) Int. Cl.
  *H04L 9/32*   (2006.01)
  *H04L 9/08*   (2006.01)
  *H04L 9/40*   (2022.01)

(52) U.S. Cl.
  CPC .......... *H04L 9/3213* (2013.01); *H04L 9/0894* (2013.01); *H04L 63/045* (2013.01); *H04L 63/10* (2013.01)

(58) Field of Classification Search
  CPC ....... H04L 9/045; H04L 9/0894; H04L 9/088; H04L 9/3213; H04L 9/3247; H04L 9/40; H04L 63/10; H04L 63/1425; H04L 63/1466; H04L 63/0807; H04L 63/0861; H04L 63/20
  See application file for complete search history.

(56) References Cited

U.S. PATENT DOCUMENTS

| | | | | |
|---|---|---|---|---|
| 7,797,751 B1* | 9/2010 | Hughes | ........... | G06F 21/64 726/19 |
| 8,621,592 B2* | 12/2013 | Benaloh | ........... | H04L 63/0807 713/150 |
| 9,002,386 B2* | 4/2015 | Ngo | ........... | H04W 12/041 455/466 |
| 9,820,078 B2* | 11/2017 | Ngo | ........... | H04W 4/14 |
| 10,659,467 B1* | 5/2020 | Verma | ........... | H04L 63/10 |
| 10,944,561 B1* | 3/2021 | Cahill | ........... | H04L 9/3213 |
| 11,682,072 B2* | 6/2023 | Kim | ........... | H04L 9/3247 705/300 |
| 11,743,048 B2* | 8/2023 | Haque | ........... | H04L 63/10 713/156 |
| 2015/0350186 A1* | 12/2015 | Chan | ........... | H04L 63/0815 726/9 |
| 2016/0226840 A1* | 8/2016 | Buccella | ........... | G16H 40/20 |
| 2016/0344635 A1* | 11/2016 | Lee | ........... | H04L 47/20 |
| 2018/0300471 A1* | 10/2018 | Jain | ........... | H04L 63/105 |
| 2021/0067341 A1* | 3/2021 | Haque | ........... | H04L 9/14 |

(Continued)

OTHER PUBLICATIONS

International Preliminary Report on Patentability and Written Opinion for Application No. PCT/US2023/066327, dated Jul. 7, 2023, 9 pages.

(Continued)

*Primary Examiner* — Linglan Edwards (57) ABSTRACT

A method may include accessing a key from a secure storage. A payload may be encrypted using the key. A policy token may be generated. The policy token may include a publicly-readable header including a header identifier of the key and the payload encrypted using the key. The policy token may be sent. The policy token may be received. The publicly-readable header may be read. The key may be identified using the header identifier of the key from the publicly-readable header. The key may be accessed from the secure storage. The payload may be decrypted using the key.

16 Claims, 4 Drawing Sheets

(56) References Cited

U.S. PATENT DOCUMENTS

2021/0273805 A1    9/2021  Jain et al.
2023/0224314 A1*   7/2023  Kolluru ............... H04L 63/1425
                                                                726/22

OTHER PUBLICATIONS

International Preliminary Report on Patentability and Written Opinion for Application No. PCT/US2023/066327, dated Oct. 29, 2024, 5 pages.

* cited by examiner

ACCESS POLICY TOKEN

FIELD

The embodiments discussed herein are related to access policy tokens.

BACKGROUND

Access tokens are often used to verify a user's identity and/or a user's privileges. Access tokens may be used in place of passwords when accessing certain systems or applications. Access tokens are conventionally used to represent security information, but may also hold additional data.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

A computing system that uses a zero-trust architecture (ZTA) may operate based on the premise that systems that rely on trust may be vulnerable to a malicious or irresponsible user. Once a user gains access to a system that relies on trust, the entirety of the system may be laid open to the user. Computing systems using ZTAs, on the other hand, offer additional layers of protection by establishing points at which tokens facilitate access to the system.

Tokens are tools that may be implemented to perform security functions in computing systems and networks. The tokens are data objects that store tamper-proof information relating to the security identity of a computing process. In some instances, the tokens may include electronic signatures (e.g., a data sequence, a string, an integer, etc.) that may be encrypted and decrypted using asymmetric keys. Access tokens are a type of token that describe security credentials for a user login session to access one or more resources of a computing system. In some circumstances, the security credentials may relate to a user's identity, groups, privileges, clearance level for particular resources or applications, or any other information about the user. The access tokens may be used to facilitate secure A-to-B communication or securing data from non-authorized users within a system. For example, a particular resource may be located on a web server at a particular universal resource locator (URL) that may only be accessed with a corresponding access token. Attempting to go to the URL without the access token may result in being denied access to the particular resource. However, appending the corresponding access token to the end of the URL may permit access to the particular resource.

In some conventional systems, an access token may be unsecured from users who have a universal resource identifier (URI) that corresponds to the access token. In other words, a user that knows the URI to which a particular access token corresponds might know or be able to discern restrictions imposed by the particular access token. As such, a threat actor may bypass the restrictions imposed by the particular access token more easily after identifying the URI that corresponds to the particular access token. Additionally, in some conventional systems, an access token may not include a mechanism for permitting access to a particular resource to a first user while denying access to the particular resource to a second user. Thus, any user who knows the URI corresponding to the access token may access the particular resource.

An example of a conventional access token used to secure URIs are JSON web tokens following a JSON web encryption process. JSON web tokens typically include a publicly readable header that provides information for software applications about what data is included in the JSON web token and how the data should be handled. The JSON web tokens also include a publicly readable payload, which is often a JSON object that a first user wants to transfer to a second user. The JSON web tokens may also include a non-forgeable electronic signature that is generated using an asymmetric encryption process. For example, the electronic signature of a particular JSON web token may be generated using a private key, while the user to which the JSON web token is sent may be capable of verifying the authenticity of the electronic signature using a public key.

Additionally, the header and/or the payload of the JSON web token may be encrypted or otherwise protected according to a JSON web encryption process in which the header and/or the payload of the JSON web token is encrypted using a symmetric key scheme. The key corresponding to the symmetric encryption of the JSON web token is encrypted and included as part of the JSON web token using a public key shared by the intended user of the JSON web token who holds the private key that corresponds to the public key. The JSON web token will be sent to the intended user. Consequently, only an intended user of the JSON web token may be capable of decrypting the header and/or the payload of the JSON web token transferred according to the JSON web encryption process.

As briefly described above, disadvantages of using a conventional JSON web token and JSON web encryption scheme relate to the public availability of the information associated with the JSON web token and to the need for public keys to be shared before a token may be used. In some situations, the header and/or the payload of the JSON web token may be available for unintended users to view. Additionally, the unintended users may verify that the JSON web token was issued by a particular user based on the asymmetric encryption of the electronic signature of the JSON web token. As such, the JSON web token may provide a secure method of authenticating the data included in the payload of the JSON web token and for transferring sensitive information in the payload. However, the JSON web token may be unsuitable for encryption and authentication of the payload without having access to security keys belonging to other systems.

These and other technical shortcomings are addressed by embodiments described in the present disclosure. For instance, some embodiments describe a policy token. The policy token is a token that is configured to verify whether a particular user satisfies one or more security policies related to accessing a particular resource of a computing system. Additionally or alternatively, the policy token may be used for modifying URIs for use outside of a zero-trust system, or for any other authentication or cybersecurity applications. In some embodiments, the policy tokens may allow a user to publicly distribute secure information and to securely access it later. The policy token may be publicly available but might include encrypted contents that are only accessible by a token producer.

The policy tokens may also be used for protecting one user's data from another user in a computing system. The policy token may have built-in protections that allow the token producer to decrypt the policy token for only the intended user and which may be used to identify any attempted uses by unauthorized users. This allows for free distribution of policy tokens within a computing system without worry of users misappropriating another user's data.

Policy tokens may be used as a part of modified URIs. The policy token may take the place of a signature in the URI. Inclusion of the policy token may enable the URI to be used for multiple applications while carrying signature information embedded within the policy token. Additionally, in some embodiments, the policy token may include instructions for restoring the URI to its unmodified state. This may allow a URI to be modified for use in a variety of applications and then restored to perform its original function. For example, a particular policy token may function as an access token appended to a URI to facilitate access to a particular resource by the URI. The particular policy token may also include a security access policy indicating that the particular resource may not be accessed from a device located in a particular jurisdiction such as Europe. Replacing the original signature of the URL with the particular policy token may allow a user who satisfies the security access policy (e.g., by being located in North America) to access the particular resource.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
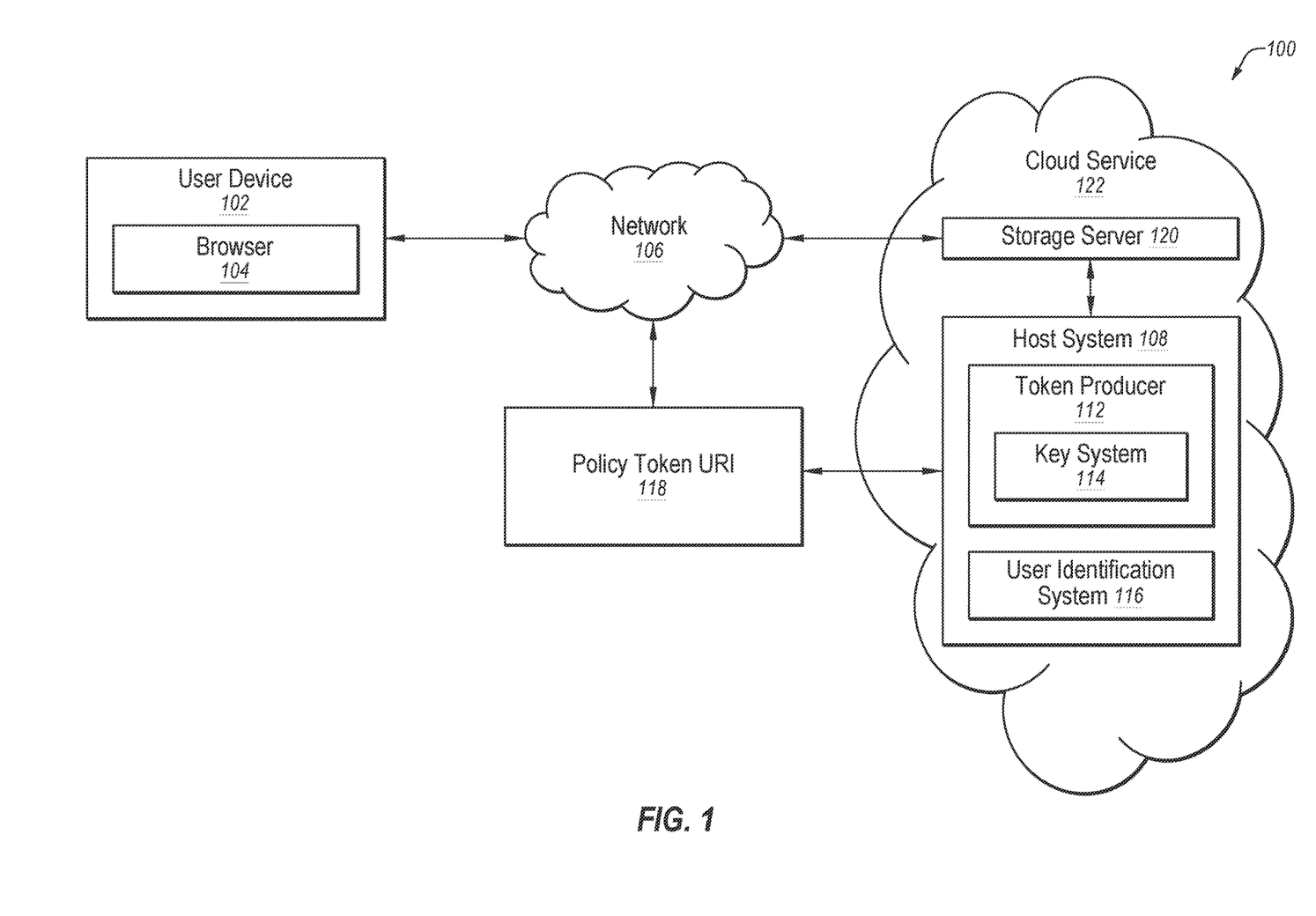
FIG. 1 illustrates an example policy token system.

FIG. 1 illustrates an example policy token system 100 in which some embodiments of the present disclosure may be implemented. In the policy token system 100, a host system 108 may provide resources to various user devices 102. The host system 108 may generate uniform resource identifiers (URIs) that each identify a respective resource provided by the host system 108. In response to requests by the user devices 102 to access a particular resource hosted by the host system 108, the URI corresponding to the particular resource may be provided to the user devices 102 (such as by the host system 108) so that the user devices 102 may locate, identify, and access the particular resource.

In some situations, it may not be desirable to permit one or more user devices of the user devices 102 to access a particular resource because the one or more user devices may not have established their trustworthiness, the particular resource includes sensitive information, or for any other reason. In these and other situations, the host system 108 may restrict access to particular URIs, such as by making the particular URIs only available to particular user devices. The host system 108 may restrict access to the particular URIs by, for example, associating an access token with the particular URIs such that only the particular user devices that correspond to the access token may retrieve the resource associated with the particular URIs. The access token may correspond with the particular user devices based on one or more unique characteristics of the particular user devices, such as a unique identifier of each of the particular user devices. For example, a first user device and a second user device may correspond to a particular access token in that the particular access token is configured to allow the first user device and the second user device to access a resource associated with the particular access token. The first user device and a third user device may connect to a host system (e.g., the host system 108) that includes the particular access token, and the host system may compare device identifiers of the first user device and the third user device against instructions in a token payload associated with the particular access token. Based on the comparison, the host system may allow the first user device to access the resource but deny the third user device access to the resource.

The policy token system 100 may include a host system 108. In the embodiment of FIG. 1, the host system 108 is depicted as a single server. In other embodiments, the host system 108 may include two or more servers organized as a group or cluster (e.g., a Kubernetes cluster) two or more virtual machines in two or more servers, or combinations thereof. For example, the host system 108 may be a Microsoft Azure-associated server for providing cloud computing services. Additionally or alternatively, embodiments may be employed with other storage access services, such as but not limited to Google Cloud Platform Services, Amazon Web Services, and the like.

The host system 108 may provide resources to tenants of the host system 108, which may, in turn, provide some portion of those resources to one or more users by way of a user device 102. In these and other embodiments, tenants of the host system 108 may include subsystems of the host system 108 or other computer systems that are related to the host system 108. In some configurations, a user may access the resources via a browser 104 installed on the user device 102, which may communicate with the host system 108 via a network 106. The network 106 may include any wired and/or wireless network. In some embodiments, the network 106 may include the internet. Alternately or additionally, the user device 102 may access the host system 108 resources via an application installed on the user device 102, which may communicate with the host system 108 via the network 106.

The host system 108 may host a token producer 112. The token producer 112 may be configured to identify and/or be associated with a high-level user of the host system 108 and/or tenants of the host system 108. The token producer 112 may include a key system 114, which may store encryption keys.

In some embodiments, the host system 108 may include a user identification system 116 external to the token producer 112 in which the user identification system 116 may store user information and user identifiers associated with each user included in the user information. In these and other embodiments, one or more tenants of the host system 108 and/or any sub-users associated with the tenants may be included in the user information of the user identification system 116. Because the user identification system 116 is external to the token producer 112, the token producer 112 may identify, generate, and encrypt a particular token responsive to a request for one or more particular policies directed toward one or more particular users without knowing the identity of the particular users. The particular encrypted token may then be decrypted by the token producer 112 on behalf of any of the particular users for which the token producer 112 generated the particular token such that the particular users may access a particular resource protected by the particular token and a corresponding URI.

Conventionally, the host system 108 may allow access to resources of the host system 108 via a web access token, such as Azure's shared access signature (SAS) token. A URI to which the SAS token corresponds (herein "SAS token URI") may include a storage resource URI, which may identify a storage account of the host system 108, such as an Azure storage account URI, and an SAS token, which may include an SAS token signature as a query parameter for the Azure storage account URI. Additionally or alternatively, the SAS token may include a storage account of the host system 108 and a corresponding access token that are employed by any other storage access services, such as Google Cloud Platform Services or Amazon Web Services.

Figure 4:
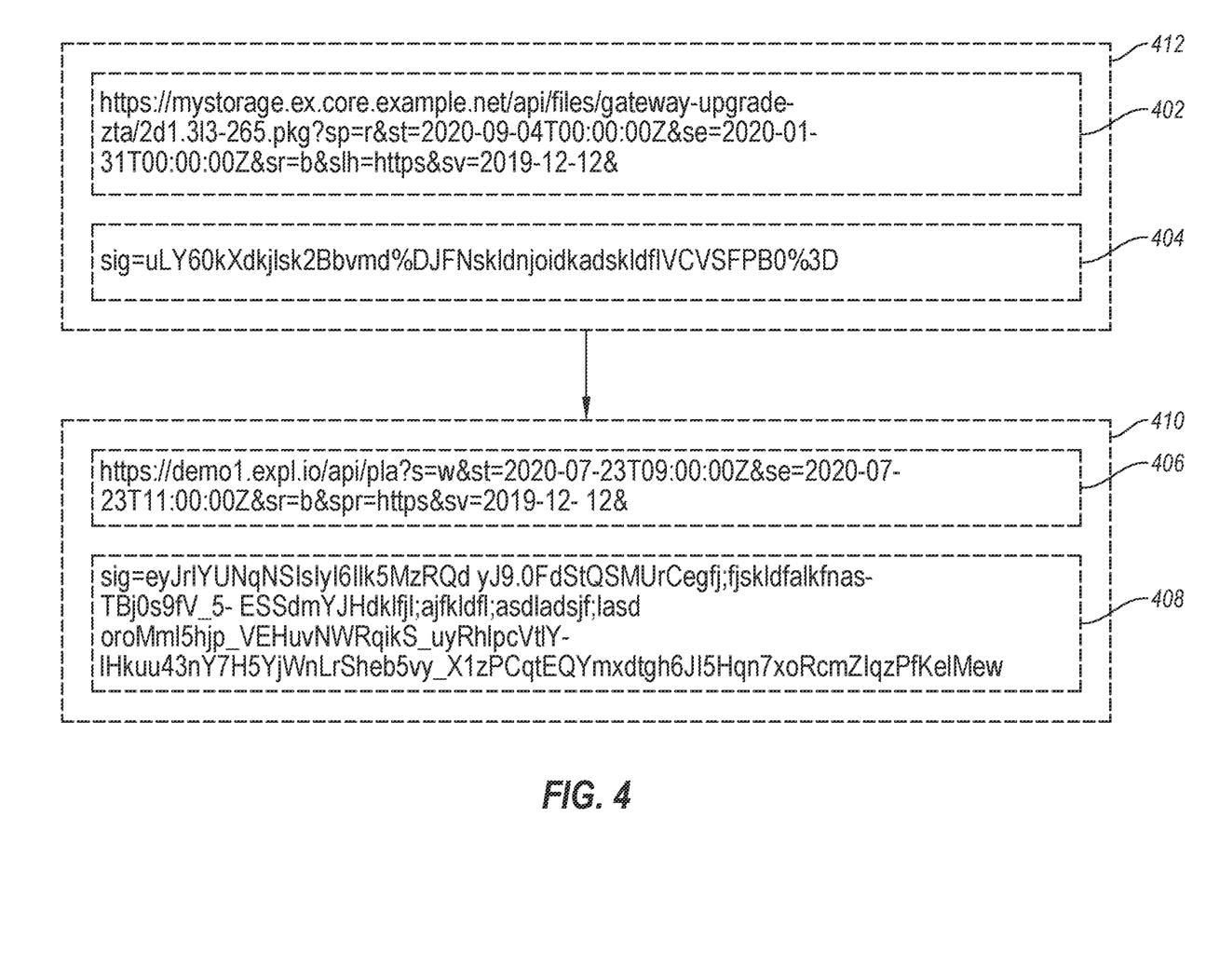
FIG. 4 illustrates an example embodiment of a policy token compared with a conventional shared access signature (SAS) token used with Azure.

FIG. 4 illustrates an example embodiment of a policy token 408 compared with a conventional SAS token signature 404 that is used with Azure. In some embodiments, the policy token 408 may be included as part of a second URI 410 that is the same or similar to the policy token URI 118 described in relation to FIG. 1. A first URI 412 is an example of a URL that may be implemented in an Azure system or another suitable system. The first URI 412 includes the SAS token signature 404 and a first incomplete URI 402. The first incomplete URI 402 may include a storage account associated with one or more users.

The second URI 410 is an example of a modified version of the first URI 412, which may be implemented in embodiments described elsewhere in the present disclosure. In the second URI 410, the first incomplete URI 402 may be modified to a second incomplete URI 406. The second incomplete URI 406 may be different from the first incomplete URI 402 and may include, for example, a network address of a host system of a storage account of the first incomplete URI 402.

In addition, the SAS token signature 404 may be modified to the policy token 408. The policy token 408 may be included in the second URI 410. In some embodiments, the policy token 408 may include a publicly readable header and an encrypted payload to facilitate issuing the policy token 408 outside of the host system while also protecting the information content of the policy token 408. Simultaneously protecting the payload of the policy token 408 and facilitating communication of the policy token 408 outside of the host system may improve A-to-A communication by securely protecting the payload content. The payload may be encrypted using a key that is not issued with the policy token 408 and is known only to a token producer, such as the token producer 112 of FIG. 1. Information regarding how to decrypt the payload may be included in the publicly readable header, which may indicate the key that was used to encrypt the payload. In these and other embodiments, a secure key storage system including a particular key used to encrypt and to decrypt a particular policy token may be accessible to the token producer but unavailable to third parties. As such, the information in the publicly readable header regarding the keys involved with encrypting or decrypting the policy token payload may be useful to the token producer while also being useless to a (potentially malicious) third party that does not have access to the secure key storage system.

In some embodiments, the policy token 408 may also be configured for inter-user protection during A-to-A communication. In other words, the policy token 408 may be configured such that the policy token 408 is accessible to a first user of the host system but inaccessible to a second user of the same host system. In these and other embodiments, the publicly readable header of the policy token 408 may include an unmodified initialization vector used for symmetric encryption of the payload.

In some embodiments, the unmodified initialization vector may be encrypted or otherwise modified based on the identity of a particular user included in the host system. For example, each user of the host system may be assigned a unique user identifier, and the unique user identifier may be used to encrypt the unmodified initialization vector to generate the modified initialization vector used to encrypt the payload. Because the modified initialization vector was generated by modifying using the intended first user's unique identifier, the intended first user of the policy token 408 may be capable of recreating the same modified initialization vector, but unauthorized second users of the same host system may be incapable of generating the same modified initialization vector without having access to the unique user identifier of the intended first user. Additionally or alternatively, the publicly readable header may include a non-reversible fingerprint that is associated with the intended first user of the policy token 408. The non-reversible fingerprint may provide a mechanism for detecting unauthorized attempts at using the policy token 408 and the corresponding identity of the intended first user of the policy token 408.

In some embodiments, a host system, such as the host system 108 described in relation to FIG. 1, may receive a URL containing a policy token that has an original signature associated with a particular user incorporated in the policy token. The host system may send the original signature of a URL to a destination user account to which the original signature corresponds and replace the policy token 408 at the destination user account with the original signature of the URL. In these and other embodiments, the policy token 408 may be capable of operating with various URL protocols because the policy token 408 may be configured to include the original signature associated with a given URL.

Returning to the description of FIG. 1, in some embodiments, the host system 108 and a storage server 120 may be included in a cloud service 122 or another data storage service. The host system 108 may comprise one or more virtual machines that are hosted by the cloud service 122, which may be a server bank, such as a server bank hosted by MICROSOFT® AZURE® or AMAZON WEB SERVICES® (AWS®). In these and other embodiments, the host system 108 may authorize communications between the storage server 120 and the network 106. The storage server 120 may host various computer resources that may be accessed with corresponding resource URIs. As such, the host system 108 may facilitate transmittal or reception of the policy token URI 118 between the host system 108 and one or more user devices 102 via the network 106 to allow the user devices 102 to access the computer resources stored on the storage server 120.

In some embodiments, the policy token system 100 may allow access to resources of the host system 108 or storage server 120 via the policy token URI 118. Some additional details of an example policy token URI that might be implemented in the policy token system 100 are provided with reference to FIG. 2.

Modifications, additions, or omissions may be made to the policy token system 100 without departing from the scope of the present disclosure. For example, the policy token system 100 may include one or more user devices 102, one or more host systems 108, one or more storage servers 120, one or more policy token URIs 118, or any combination thereof.

Moreover, the separation of various components and devices in the embodiments described herein is not meant to indicate that the separation occurs in all embodiments. For example, the storage server 120, the policy token URI 118, the host system 108, the token producer 112, the key system 114, and/or the user identification system 116 may be combined and/or separated in one or more components. In some embodiments, the storage server 120 or components thereof may be distinct and separable from the host system 108 or components thereof. In these and other embodiments, the storage server 120 may have an independent and distinct IP address from the host system 108. Additionally or alternatively, in some embodiments, the storage server 120 and the host system 108 or portions thereof may be integrated into one or more common physical computing systems. For instance, the storage server 120 and the host system 108 may exist on a cloud computing platform with a first portion configured for the storage server 120 and another portion configured for the host system 108 or may be implemented in a single, hardware-based computing system. Moreover, it may be understood with the benefit of this disclosure that the described components and servers may generally be integrated together in a single component or server or separated into multiple components or servers.

Figure 2:
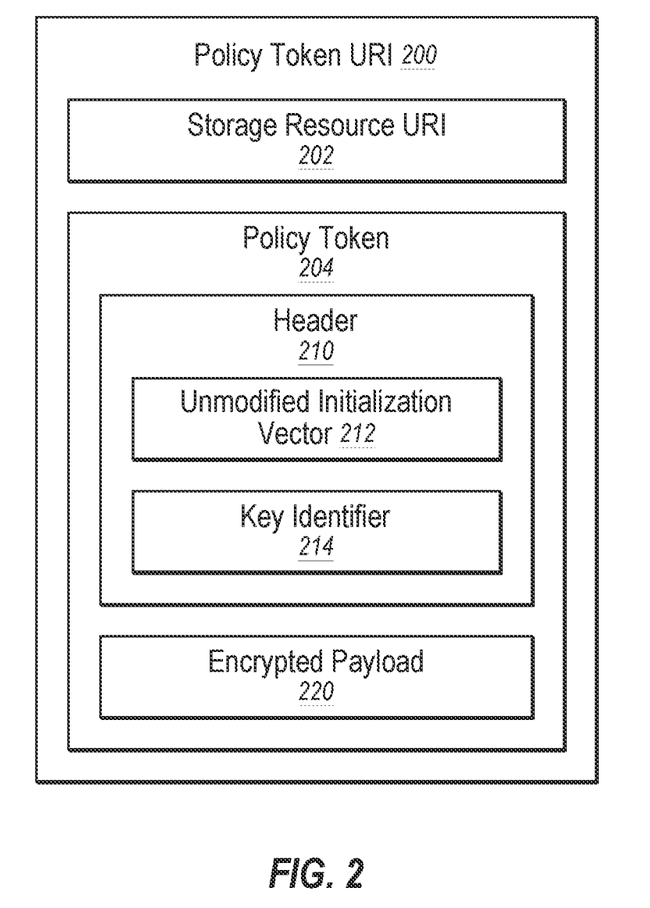
FIG. 2 is a block diagram illustrating an example policy token universal resource identifier.

FIG. 2 is a block diagram illustrating an example policy token URI 200 that may be substantially similar to and may correspond to the policy token URI 118 implemented as part of the policy token system 100 or another suitable system. In some embodiments, the policy token URI 200 may include a storage resource URI 202. In some embodiments, the storage resource URI 202 may identify a host system, rather than a storage account of a host server.

The policy token URI 200 may include a policy token 204. In some embodiments, the policy token 204 may replace a query parameter in an existing access token, such as a SAS token, in a conventional access URL. In some embodiments, the token producer may generate an access token signature based on known rules or protocols of a host server, such as the storage server 120 of FIG. 1. The whole or part of the access token signature may be stored within the policy token 204. The original access token signature may be provided to the host server to facilitate access to the storage server. Thus, for example, the policy token URI 200 may contain the signature needed to reconstruct the original access token and facilitate access to resources on the storage server. For example, in some configurations a token producer, such as the token producer 112 of FIG. 1, may generate the policy token 204 and produce the policy token URI 200 by using the policy token 204 to replace the access token signature in an access token that would permit access to resources on the storage server 120. Additionally or alternatively, the policy token 204 may replace the host name in the storage resource URI for the storage server 120 with a host name of the host system 108. When the policy token URI 200 is sent by the user device 102 to the host system 108, the host system 108 may replace the signature and forward the request to the storage server 120 to facilitate the requested access. In some configurations, replacing an original access token signature may facilitate using the replacement policy token in software libraries and the like that may be configured to expect the original policy token signature.

The policy token 204 may include a header 210 and an encrypted payload 220. The encrypted payload 220 may include a signature needed to reconstruct an original access token signature and/or additional information that has been encrypted according to an encryption key and an initialization vector.

The header 210 may include a key identifier 214 that may identify the encryption key used to encrypt the encrypted payload 220. The key identifier 214 may be associated with the encryption key within a key system maintained by a token producer, such as the key system 114 of FIG. 1. For example, the key identifier 214 may identify an index location of the encryption key within a key system. Thus, for example, the key identifier 214 may not provide substantive information regarding the value of the encryption key but may provide information a token producer may employ to recall the encryption key from a key system available only to the token producer.

The header 210 may include an unmodified initialization vector 212. The unmodified initialization vector 212 may be based on the initialization vector that was used, along with the encryption key, to encrypt the encrypted payload 220. The unmodified initialization vector 212 may be modified in a fixed, reproducible way based on a user identifier associated with an intended user of the policy token URI 200 and/or associated policy token 204 to generate the modified initialization vector that was used, along with the encryption key, to encrypt the encrypted payload 220. The user identifier may be managed via a user identification system of a token producer, such as the user identification system 116 of FIG. 1. The user identification may be known only to a token producer. Thus, for example, the policy token URI 200 may be useable only by the intended user. For instance, in response to receiving the policy token URI 200, the unmodified initialization vector 212 may be modified based on the user identification associated with the user providing the policy token URI 200. If the user providing the policy token URI 200 is the intended user, the modified initialization vector will be equal to the initialization vector used to encrypt the payload, and decryption of the encrypted payload 220 may be successful. If the user providing the policy token URI 200 is not the intended user, attempting to modify the unmodified initialization vector 212 will result in a modified initialization vector that is not equal to the modified initialization vector used to encrypt the payload and decryption of the encrypted payload 220 will be unsuccessful.

In some configurations, the token producer may determine the identity of the intended user by attempting to modify the unmodified initialization vector 212 according to all user identification values generated by the token producer. Thus, for example, the token producer may identify a user that may be experiencing a security breach or the like and may be able to identify the user attempting to perform the security breach.

Additionally or alternatively, the header 210 may include a user fingerprint that may be used to verify the identity of the user for which the policy token 204 is produced. Each user and/or each user device may be associated with a corresponding user fingerprint value. The fingerprint value included in the header 210 may be encrypted using some other part of the token, such as the unmodified initialization vector 212, so that the fingerprint value in the header 210 is different for each different policy token 204 generated for use by a particular user. In some embodiments, the user fingerprint may be included in the header 210 to link the policy token 204 to a particular intended user. By comparing the fingerprint value included in the header 210 to the fingerprint values that would have been generated for that token for a number of users, the intended user of the policy token 204 may be identified. In these and other embodiments, the user fingerprint may be constructed as a one-way function in which the user fingerprint may be constructed based on information identifying the intended user, but the user identification information may not be derived from the user fingerprint. For example, the user fingerprint may include a hash value corresponding to an input value based on information from the intended user computed based on SHA-2, SHA-3, MD5, or any other hashing algorithm.

The header 210 may be in a format such that it is publicly readable. The encrypted payload 220 may be encrypted in such a way so as to render brute-force methods of decryption virtually impossible. The encrypted payload 220 may be encrypted using Advanced Encryption Standard (AES), Triple Data Encryption Standard (DES), Twofish, or any other symmetric encryption method. Encrypting the payload using a symmetric encryption method may allow the encryption method to forgo using a public-private key infrastructure for sharing keys between a sender and a recipient. Additionally or alternatively, the encrypted payload 220 may be encrypted using a Rivest-Shamir-Adleman (RSA) or any other asymmetric encryption method irrespective of whether a public key has been shared between the sender and the recipient.

Figure 3:
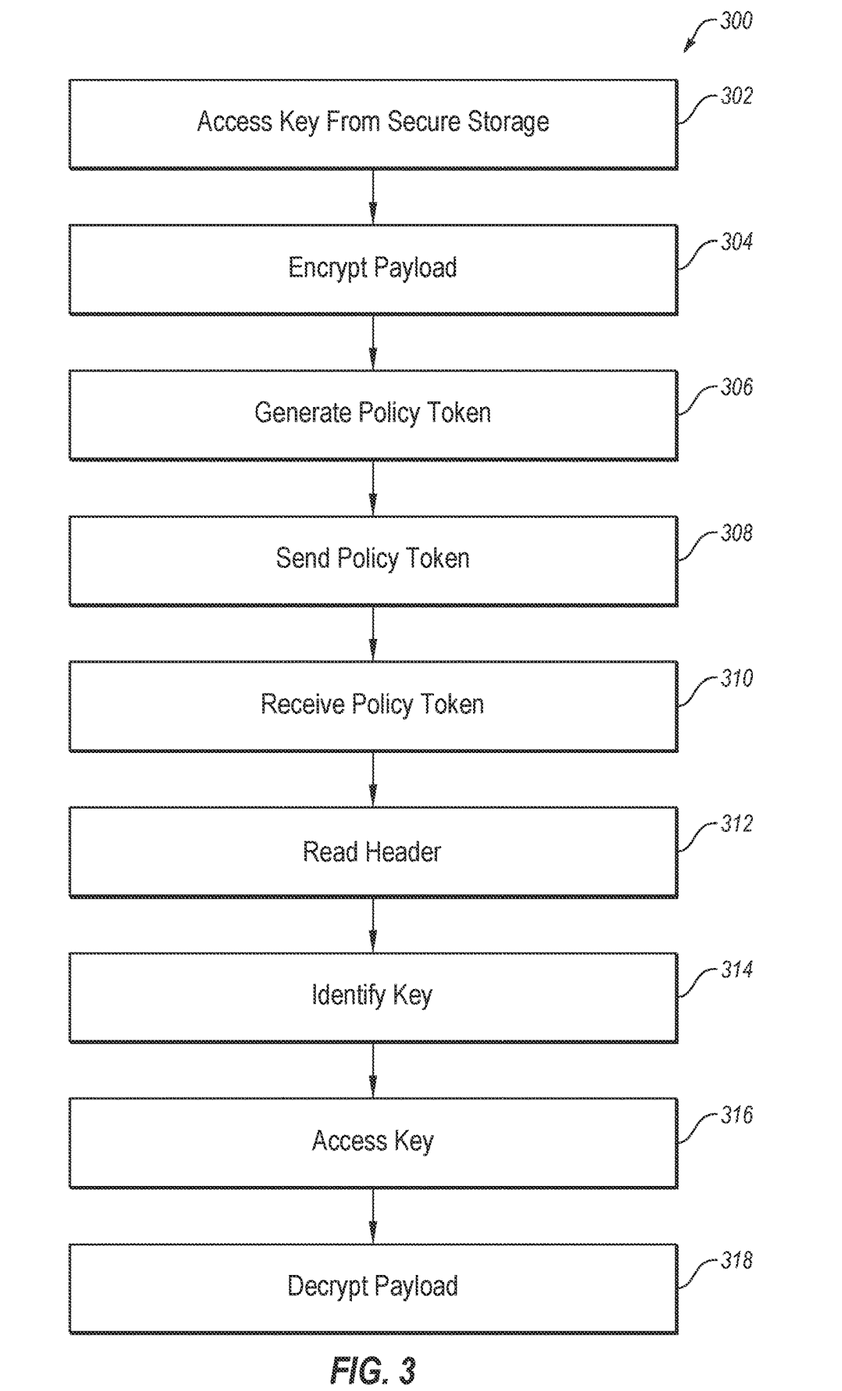
FIG. 3 illustrates a flowchart of an example method of generating and using a policy token to securely access a system or a resource.

FIG. 3 is a flowchart of a method 300 of providing access to server resources. The method 300 may begin at block 302 by accessing an encryption key from a secure storage. The secure storage may generally correspond to the key system 114 of the host system 108 of FIG. 1.

The method 300 may continue at block 304 by encrypting a payload using the encryption key. The encrypted payload may generally correspond to the encrypted payload 220 of FIG. 2. In some embodiments, the encrypted payload may include an access token. Optionally, the access token may include an Azure SAS signature token.

The method 300 may continue at block 306 by generating a policy token. The policy token may generally correspond to the policy token 204 of FIG. 2. The policy token may include a header, which may include a header identifier of the encryption key. The header and the header identifier of the encryption key may generally correspond, respectively, to the header 210 and the key identifier 214 of FIG. 2. In some embodiments, the user identifier used to modify the initialization vector may be unique to a particular user device. In other words, each user device may include a respective user identifier that is different from each other user identifier associated with each other user device. The unmodified version of the initialization vector may correspond to the unmodified initialization vector 212 described in relation to FIG. 2. The header may be publicly readable such that any user device through which the policy token is routed may read the (potentially encrypted) encryption key identifier and the (potentially modified) initialization vector.

The policy token may further include the encrypted payload. Additionally or alternatively, the header of the policy token may include a fingerprint value generated based on the user identifier used to modify the initialization vector such that the fingerprint value is configured to identify the user device that the policy token is intended to be used by. In some embodiments, the payload of the policy token may further include an electronic signature corresponding to an access token of a URL. The policy token may replace a query parameter associated with a storage server as described in relation to the encrypted payload of the policy token including an access token.

The method 300 may continue at block 308 by sending the policy token. The policy token may be sent to a user device generally corresponding to the user device 102 of FIG. 1. In some configurations, the policy token may be sent as a portion of a policy token URI generally corresponding to the policy token URI 200 of FIG. 2.

In some embodiments, the policy token sent at block 308 may be routed to one or more third-party entities for which the policy token is not intended. The policy token may be routed to one or more user devices for which the policy token is intended through the third-party entities. However, because the policy token is encrypted such that only the token producer may read the policy token payload, the third-party entities through which the policy token is passed are unable to use or read the protected information associated with the policy token. Additionally or alternatively, the third-party entities through which the policy token is passed may be able to read unencrypted values in the header, but the third-party entities may not be able to use these unencrypted values to access the payload or identify the intended user of the token.

The method 300 may continue at block 310 by receiving the policy token. The policy token may be received from the user device generally corresponding to the user device 102 of FIG. 1. In some configurations, the policy token may be received as a portion of the policy token URI.

The method 300 may continue at block 312 by reading the header. The token producer may modify the initialization vector included in the header using the user device's user identifier. The method 300 may continue at block 314 by identifying the encryption key using the identifier of the encryption key from the header. The method 300 may continue at block 316 by accessing the encryption key from the secure storage.

The method 300 may continue at block 318 by decrypting the payload using the encryption key and the modified initialization vector (or the unmodified initialization vector depending on the system configuration). The user device may access a resource corresponding to a URI included in the payload. For example, the decrypted payload may include a URL corresponding to a location of a resource included in a web server. In some embodiments, the payload may also specify one or more criteria according to a security access policy for the user device to satisfy before accessing the resource. For example, the security access policy may include verifying a location of the user device by comparing a geographic location of the user device as determined by an internet protocol (IP) address associated with the user device to a geographic location as determined by a global positioning system (GPS) or any other location-tracking processes. As another example, the security access policy may limit access to the resource based on a type of user device (e.g., a smartphone versus a personal computer) and/or a time at which the user device requests access to the resource.

In some embodiments, the method 300 may continue by providing a user device with access to server resources, based, at least on part on the decrypted payload. The user device may generally correspond to the user device 102 of FIG. 1. Alternately or additionally, the method 300 may further include replacing a query parameter of an Azure URI with an electronic signature. For example, a particular policy token may be a security policy that specifies only specific types of devices are permitted to access a particular resource. A user device may be granted access to the particular resource if and only if the user device is included in the specific types of devices described by the security policy.

In some embodiments, the payload may be further encrypted and decrypted using an initialization vector. A policy token including the header generated according to the method 300 may further include an initialization vector. The method 300 may further include modifying the unmodified initialization vector based on a user identification associated with the policy token to generate a modified initialization vector. The modified initialization vector may further be used instead of the unmodified initialization vector to encrypt and decrypt the payload. The policy token may be sent to a user associated with the user identification associated with the policy token. The policy token may be received from a providing user. The unmodified initialization vector may be modified based on the user identification associated with the providing user to generate a modified initialization vector. Decrypting the payload may include using the modified initialization vector. If the providing user and the user associated with the user identification associated with the policy token are the same, the payload may be decrypted successfully. If the providing user and the user associated with the user identification associated with the policy token are different, decrypting the payload may be unsuccessful.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of secured resource access using an encrypted token, the method comprising:
   receiving a first access token configured to permit access to a resource on a storage server, the first access token including a first access token signature and a first host name for the storage server;
   symmetrically encrypting a payload using an encryption key and an initialization vector, the encryption key being stored in a secure key storage of a host system that is associated with a user device, wherein the payload includes information used to reconstruct the first access token signature;
   generating a policy token URI that includes:
      a storage resource URI that identifies the host system instead of the first host name for the storage server;
      a policy token that includes the encrypted payload and a publicly readable header, wherein the publicly readable header includes a key identifier of the encryption key; and the initialization vector;
   replacing the first access token signature of the first access token with the policy token;
   sending the policy token URI to a user device such that following receipt of the policy token URI, the host system accesses the encryption key at the secure key storage using the publicly readable header identifier and decrypts the payload using the encryption key and the initialization vector; and
   based on the encrypted payload, providing the resource associated with the decrypted payload from the storage server to the user device.

2. The method of claim 1, further comprising modifying the initialization vector prior to the symmetric encryption of the payload.

3. The method of claim 2, wherein:
   a user identifier is used to modify the initialization vector; and the user identifier is unique to the user device or a user associated with the user device.

4. The method of claim 1, wherein:
the publicly readable header further includes a fingerprint value;
the fingerprint value is configured to allow verification of the user device for which the policy token URI is intended to be used;
the fingerprint value is generated based on a user identifier; and
the user identifier is unique to the user device or a user associated with the user device.

5. The method of claim 1, further comprising:
generating the fingerprint value using a one-way function;
receiving an indication of an attempt to access the policy token URI by a second user device;
responsive to the indication, comparing the first fingerprint value with a second fingerprint value that corresponds to the second user device; and
responsive to a determination that the fingerprint value and the second fingerprint value are not the same, verifying that the attempt to access the policy token by the second user device is an unauthorized access attempt.

6. The method of claim 1, wherein:
the encrypted payload further includes a security access policy for the user device or the user; and
access to the encrypted payload is based on satisfaction of the security access policy.

7. The method of claim 6, wherein the security access policy relates to one or more or a combination of: an internet protocol address of the user device, a geographic location of the user device, a type of the user device, and a time of access by the user device.

8. One or more non-transitory computer-readable storage media configured to store instructions that, in response to being executed, cause a system to perform operations, the operations comprising:
receiving a first access token configured to permit access to a resource on a storage server, the first access token including a first access token signature and a first host name for the storage server;
symmetrically encrypting a payload using an encryption key and an initialization vector, the encryption key being stored in a secure key storage of a host system that is associated with a user device, wherein the payload includes information used to reconstruct the first access token signature;
generating a policy token URI that includes:
a storage resource URI that identifies the host system instead of the first host name for the storage server;
a policy token that includes the encrypted payload and a publicly readable header, wherein the publicly readable header includes a key identifier of the encryption key; and the initialization vector;
replacing the first access token signature of the first access token with the policy token;
sending the policy token URI to a user device such that following receipt of the policy token URI, the host system accesses the encryption key at the secure key storage using the publicly readable header identifier and decrypts the payload using the encryption key and the initialization vector; and
based on the encrypted payload, providing the resource associated with the decrypted payload from the storage server to the user device.

9. The one or more non-transitory computer-readable storage media of claim 8, wherein the operations further comprise modifying the initialization vector prior to the symmetric encryption of the payload.

10. The one or more non-transitory computer-readable storage media of claim 9, wherein:
a user identifier is used to modify the initialization vector; and
the user identifier is unique to the user device or a user associated with the user device.

11. The one or more non-transitory computer-readable storage media of claim 9, wherein:
the publicly readable header further includes a fingerprint value;
the fingerprint value is configured to allow verification of the user device for which the policy token URI is intended to be used;
the fingerprint value is generated based on a user identifier; and
the user identifier is unique to the user device or a user associated with the user device.

12. The one or more non-transitory computer-readable storage media of claim 11, further comprising:
generating the fingerprint value using a one-way function;
receiving an indication of an attempt to access the policy token URI by a second user device;
responsive to the indication, comparing the first fingerprint value with a second fingerprint value that corresponds to the second user device; and
responsive to a determination that the fingerprint value and the second fingerprint value are not the same, verifying that the attempt to access the policy token URI by the second user device is an unauthorized access attempt.

13. The one or more non-transitory computer-readable storage media of claim 9, wherein:
the encrypted payload further includes a security access policy for the user device or a user associated with the user device; and
access to the encrypted payload is based on satisfaction of the security access policy.

14. The one or more non-transitory computer-readable storage media of claim 13, wherein the security access policy relates to one or more or a combination of: an internet protocol address of the user device, a geographic location of the user device, a type of the user device, and a time of access by the user device.

15. A system, comprising:
one or more processors; and
one or more non-transitory computer-readable storage media configured to store instructions that, in response to being executed, cause the system to perform operations, the operations comprising:
receiving a first access token configured to permit access to a resource on a storage server, the first access token including a first access token signature and a first host name for the storage server;
symmetrically encrypting a payload using an encryption key and an initialization vector, the encryption key being stored in a secure key storage of a host system that is associated with a user device, wherein the payload includes information used to reconstruct the first access token signature;
generating a policy token URI that includes:
a storage resource URI that identifies the host system instead of the first host name for the storage server;

a policy token that includes the encrypted payload and a publicly readable header, wherein the publicly readable header includes a key identifier of the encryption key; and the initialization vector;

replacing the first access token signature of the first access token with the policy token;

sending the policy token URI to a user device such that following receipt of the policy token URI, the host system accesses the encryption key at the secure key storage using the publicly readable header and decrypts the payload using the encryption key and the initialization vector; and based on the encrypted payload, providing the resource associated with the decrypted payload from the storage server to the user device.

16. The system of claim 15, further comprising:

generating a first fingerprint value using a one-way function, wherein the first fingerprint value corresponds to an identity of the user device for which the payload of is intended to be used, wherein the first fingerprint value is included in the publicly readable header;

receiving an indication of an attempt to access the policy token by a second user device;

responsive to the indication, comparing the first fingerprint value with a second fingerprint value that corresponds to the second user device; and responsive to a determination that the first fingerprint value and the second fingerprint value are not the same, verifying that the attempt to access the policy token by the second user device is an unauthorized access attempt.

\* \* \* \* \*